Figure 2:
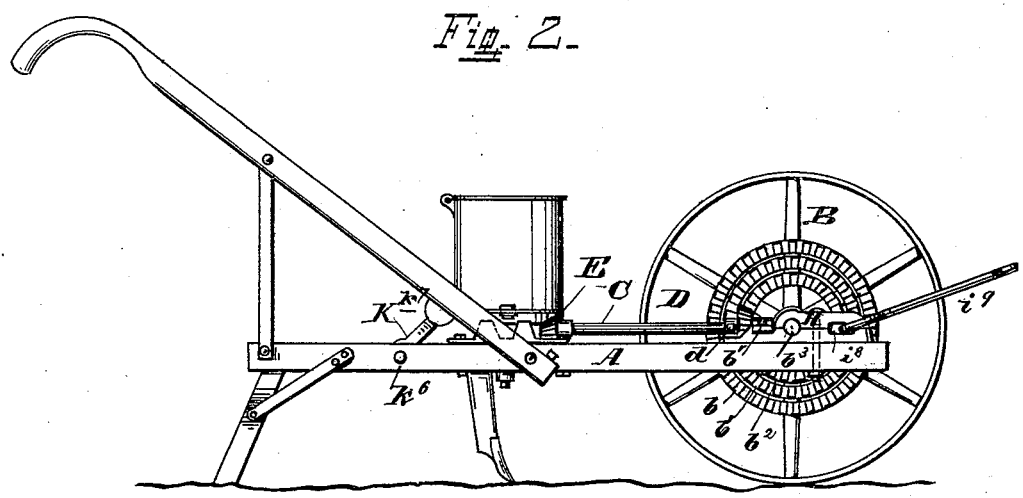

(No Model.)  5 Sheets—Sheet 1.

C. E. WHITE & J. MORPHY.
CORN AND SEED PLANTER.

No. 343,286.  Patented June 8, 1886.

Attest
Carl Spengel
Alphonso Carmichael

Inventors
Charles E. White
James Morphy
By Harper & Blakemore Attys (No Model.)  5 Sheets—Sheet 2.
C. E. WHITE & J. MORPHY.
CORN AND SEED PLANTER.
No. 343,286. Patented June 8 1886.
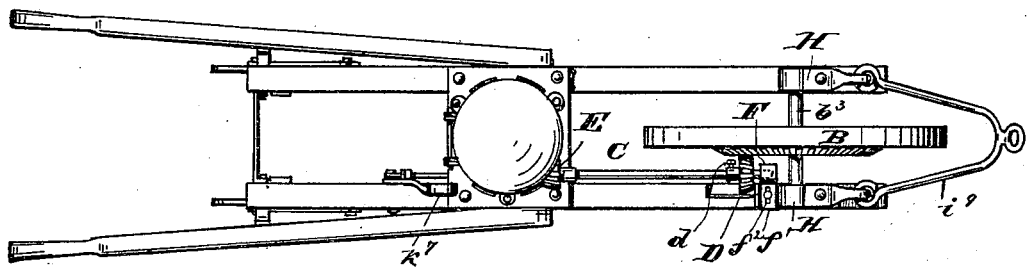
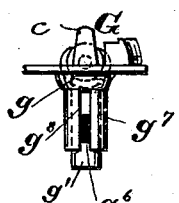
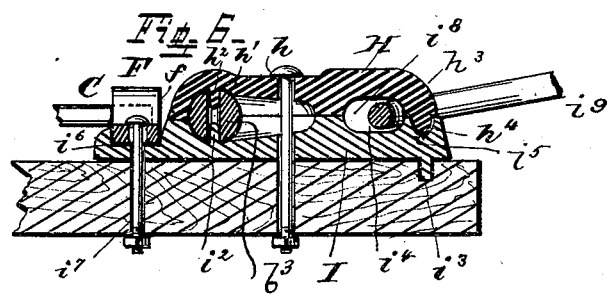
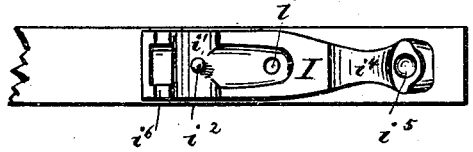
Attest
Carl Spengel
Alphonss Carmichael
Charles E. White
James Morphy
Inventors
By Harper & Blakemore Atty's (No Model.)

C. E. WHITE & J. MORPHY.
CORN AND SEED PLANTER.

No. 343,286.                     Patented June 8, 1886.

Attest
Carl Spengel
Alphonso Carmichael

Inventors
Charles E. White
James Morphy
By Harper & Blakemore Atty's (No Model.) 5 Sheets—Sheet 4.
C. E. WHITE & J. MORPHY.
CORN AND SEED PLANTER.
No. 343,286. Patented June 8, 1886.
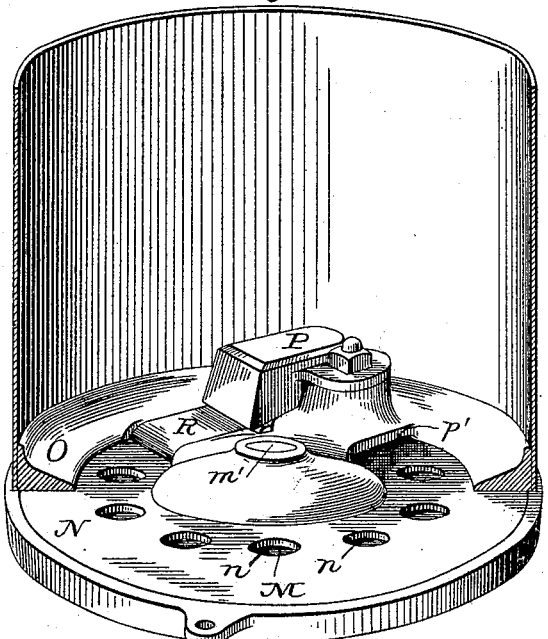
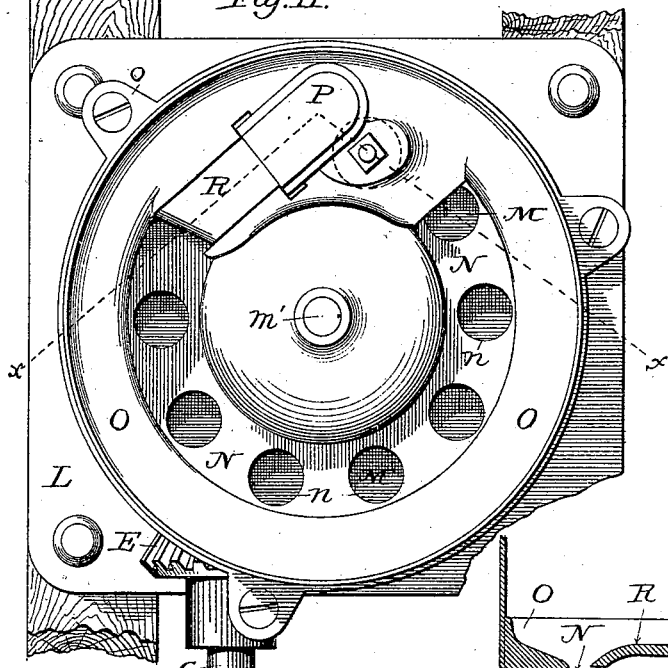
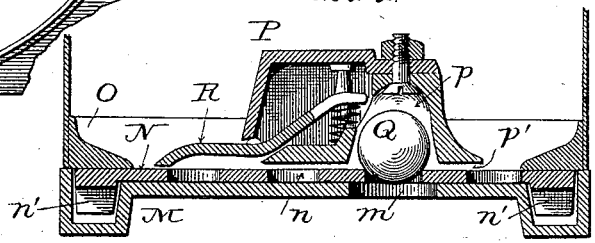
Witnesses:
James F. Duhamel
Walter S. Dodge
Inventors:
Charles E. White,
James Morphy,
Harper & Blakemore,
Attys,
per Dodgeson, Associate Attys.

(No Model.)  5 Sheets—Sheet 5.
C. E. WHITE & J. MORPHY.
CORN AND SEED PLANTER.
No. 343,286.  Patented June 8, 1886.
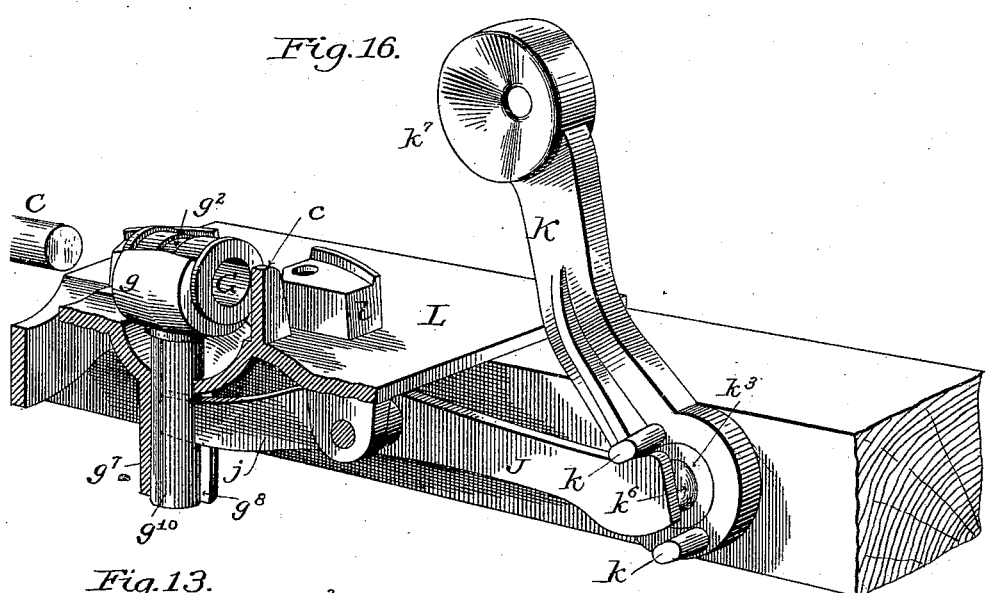
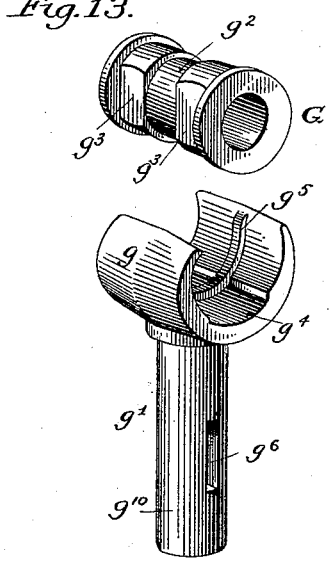
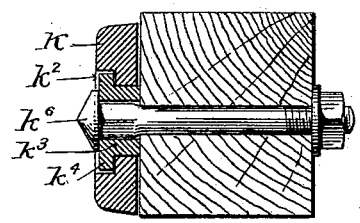
Witnesses:
James F. DuHamel
Walter S. Dodge
Charles E. White,
James Morphy,
Inventors:
by Harper & Blakemore,
Attys.,
per Dodger Son,
Associates.

UNITED STATES PATENT OFFICE.

CHARLES E. WHITE AND JAMES MORPHY, OF MOLINE, ILLINOIS, ASSIGNORS TO THE DEERE & MANSUR COMPANY, OF SAME PLACE.

CORN AND SEED PLANTER.

SPECIFICATION forming part of Letters Patent No. 343,286, dated June 8, 1886.

Application filed June 26, 1885. Serial No. 169,850. (No model.)

*To all whom it may concern:*

Be it known that we, CHARLES E. WHITE and JAMES MORPHY, of Moline, in the county of Rock Island and State of Illinois, have invented certain new and useful Improvements in Planters or Seeders, of which the following is a specification.

Our invention relates to improvements in corn or other seed planters in which the seed-wheel or seeding device is actuated through intermediate gearing by the carrying-wheel of the machine, and particularly to that class of corn-planters illustrated in the accompanying drawings, wherein a frame is mounted in front upon a single carrying-wheel having gear-teeth formed on one side parallel to its periphery, with a shaft at right angles to the axis of the carrying-wheel, working in bearings or boxes secured to such frame, having a pinion fastened thereto in front, the spurs of which mesh with the teeth of the carrying-wheel, and a like pinion in the rear engaging with teeth formed on the lower face of the seed-wheel, the carrying-wheel through its connecting-gears thereby supplying the means for actuating the latter; and it consists in the peculiar construction of devices for securing the spindle upon which the carrying-wheel revolves, whereby the same may be adjusted to the frame of the machine by the use of a single bolt, also providing means for attaching the bail to which the draft is secured and forming a seat for the forward box or bearing of the intermediate shaft.

It consists, further, in a box for the forward end of the intermediate actuating-shaft closed at its forward end and adapted by a slot in its projected side to be adjusted laterally on the frame of the machine.

It consists, further, in journaling the intermediate shaft supporting the pinions which mesh with the teeth formed on the side of the carrying-wheel in front and with the seed-wheel teeth in the rear, and supplying the means for actuating the latter in a box or bearing secured to the frame or other suitable part of the machine in front, adjustable laterally but fixed vertically, and in a vertically-sliding or adjustable bearing in the rear, whereby the rear pinion may be thrown in or out of mesh with the seed-wheel or seeding device.

It consists, further, in constructing the hopper or cross-frame in the rear of the socket in which the sliding bearing plays with an upwardly-projecting lug to retain the pinion-shaft in longitudinal adjustment.

It further consists in the peculiar construction of box or bearing for the rear end of the shaft and the support for such bearing, whereby, when the former is placed into the latter and turned, it is locked in its adjustment therein.

It consists, further, in the intermediate pinion-shaft supporting pinions meshing with gear-teeth formed on one side of the main carrying-wheel in front, and with teeth formed on the lower face of the seed-wheel in the rear, and supplying the means for actuating the latter, journaled in front in a box adjustable laterally but fixed vertically, and in a vertically-sliding bearing in the rear, having a lever engaging with the latter to lower or raise the same and throw the rear pinion out of or in mesh with the teeth on the lower face of the seed wheel or device.

It consists, further, in a shaft so journaled having such lever with a weighted handle for actuating the lever and retain the bearing in either adjustment.

It consists, further, in the peculiar construction of seeding devices and parts at the base of the hopper, and the arrangement thereof, whereby economy of space and simplicity are afforded.

It consists, further, in the peculiar construction of the lever-handle and washer and the method of securing the same to the frame of the machine, and in the various combinations and details of construction hereinafter described and claimed.

It often becomes necessary or expedient in the use of planters of this description to stop the action of the seeding device and the flow of the seed therethrough—as, for instance, in going to or coming from the field, in crossing furrows, rows, or places where no seed is to be sown, and in other cases and under various circumstances too well known to require special mention. Many devices have heretofore been employed for the purpose of controlling the action of the seeding devices and actuate them or not, as might be necessary or desirable. Most of these forms have embodied some of the numerous varieties of friction-clutches operating to disengage the seed-wheel pinion from the seeding device, or the pinion meshing with the carrying-wheel of the machine from the teeth thereon, in either case causing the seed-wheel to remain at rest. In others various styles of devices and mechanism of more or less complication have been employed; but from the complicated construction of these devices and their consequent liability to friction, wear, and ready destruction, as well as the expense of their manufacture, and many other like causes, they have not proven practically effective for the purpose. By our invention is provided an easy, simple, and inexpensive method of accomplishing this result by mechanism which cannot by any reasonably fair treatment get out of order, and its action is uniform without jarring or friction, and its adjustment, though easily accomplished when made, remains fixed until the operative lever is again actuated.

Figure 1:
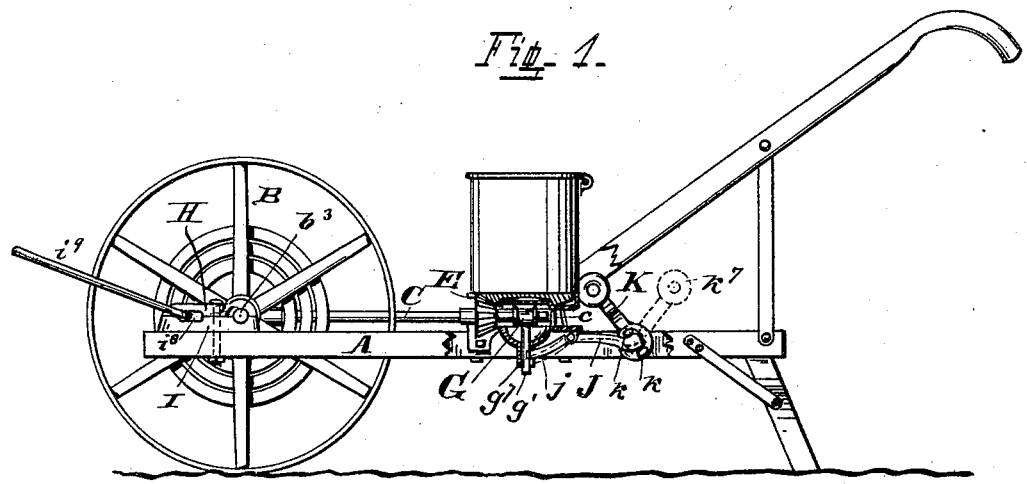

In the drawings, Figure 1 is a view from the left side of a seeding-machine embodying our invention, a portion of the frame broken away and partially in section to show the construction and arrangement of the vertically-sliding or adjustable rear bearing and lever for raising and lowering the same. Fig. 2 is a like view from the right side of such machine. Fig. 3 is a top view; Figs. 4, 5, 8, 13, 15, and 16, views illustrating the construction of the bearings for the main shaft and the mechanism connected therewith. Figs. 6 and 7, detail views of the axle-securing devices; and Figs. 9, 10, 11, 12, 14, and 17, views relating to the seeding or planting mechanism.

A is the frame of a small seeder, constructed, in the usual manner, of two pieces of timber substantially parallel, or spreading slightly from front to rear, and preferably braced by suitable cross-bars. This frame is supported in front by a carrying-wheel, B, which has a series of gear-teeth, $b\ b'\ b^2$, in lines parallel with the periphery thereof, formed integral therewith upon one of its sides, into which the front pinion, D, works and rotates the shaft as the carrying-wheel revolves. The carrying-wheel B runs loosely upon a spindle, $b^3$, which extends to the sides of the frame, to which it is secured by the devices and in the manner hereinafter described, and, besides affording a support for such wheel, serves also as a cross-bar brace to the frame.

For securing the carrying-wheel spindle to the frame of the machine, we employ a pair of devices and a single bolt for each end, which, besides performing this function, serve also as a means for attaching the draft-bail, and form on one side a seat for the projected side of the front box or bearing, hereinafter described. These spindle-fasteners consist of two parts, H and I, with bolt-holes $h\ i$ at or about their centers, as shown in Fig. 6, and concaved on one end, as at $h'\ i'$, to receive the end of the spindle, and have in such concaves projecting lugs $h^2\ i^2$, which fit into corresponding holes in the top and bottom of the spindle ends, or, preferably, as shown in the drawings, for the sake of economy of manufacture and without materially weakening the spindle, a hole is drilled clear through each end thereof, into a portion of which on top and bottom these projecting lugs from the concaves fit. The purpose of this construction of holes in the ends of the spindle and projections from the centers of the concaves to fit therein is to prevent the lateral displacement of the spindle and serve to hold it in rigid adjustment. The lower one of each of these spindle-fasteners I is constructed with a downwardly-projecting lug, $i^3$, from the forward end of its lower face, which fits into a hole drilled or bored into the frame of the machine, as shown in Fig. 6, and serves to hold such part in lateral adjustment on the frame. This part has also a concave, $i^4$, forward of the spindle-concave, and a central depression, $i^5$, in its extreme forward end, in which a projecting finger, hereinafter described, from the upper of such parts fits. This part I, on the right-hand side of the machine, is constructed with a rear extension having a transverse groove, $i^6$, which forms a seat for a projection from the front box or bearing of the actuating-shaft, hereinafter described, and in which the latter slides in and out, the box being rigidly secured when adjusted by a bolt, $i^7$, passing through the box projection, the grooved extension of the fastener, and the frame of the machine. The upper part, H, of these spindle-fasteners is constructed in front with a downwardly-curved finger, $h^3$, the end $h^4$ of which projects below its body portion, and is adapted to fit into the depression $i^5$ in the plate I, as shown in Fig. 6, the orifice $i^8$, formed thereby, affording convenient means for the insertion of the draft-bail $i^9$. We prefer to construct the rear of these parts with a depression in one and projection from the other, as shown in the drawings, in order the further to prevent twisting consequent upon the use of a single bolt; but the devices will be effective without such construction.

Figure 8:
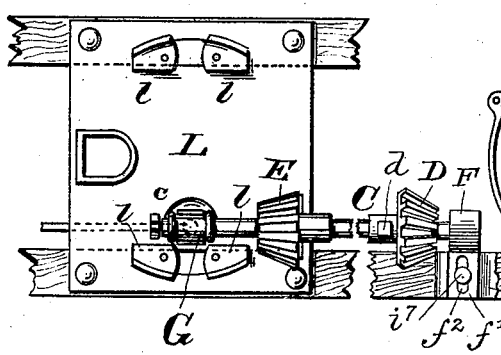

C is a shaft at right angles to the axis of the carrying-wheel, journaled in front to a box or bearing, F, secured to the frame of the machine, and having a pinion, D, at such end adjustable longitudinally thereon by a set-screw, $d$, as shown in Fig. 8, to engage with either of the series of gear-teeth $b\ b'\ b^2$ on the side of the carrying-wheel. This pinion being at right angles to the axis of the carrying-wheel, into the gear-teeth of which it meshes, the shaft is rotated as the carrying-wheel revolves. Upon the rear of the shaft, in a suitable position with reference to the seed-wheel to engage with the teeth of the latter when in gear therewith, is secured a pinion, E, at right angles to the seeding device, with the teeth upon the lower face of which it meshes when in contact.

The front box or bearing, F, for the actuating-shaft is constructed with a closed forward end, $f$, and has a lateral projection, $f'$, which fits into the groove in the rear extension of one of the lower spindle-fastening devices, and is adjustable longitudinally in such groove by the slot $f^2$ in such projection and the bolt $i^7$, as shown in Fig. 6.

The rear end of the shaft C is supported in a tubular box or bearing, G, (seen in Figs. 1, 4, 13, and 16,) the box or bearing being carried in the concave upper end, $g$, of a T-shaped vertically-sliding support, $g'$. This support is provided with a cylindrical stem, $g^{10}$, in which is a slot or socket, $g^6$, as shown in Figs. 4 and 13, the slot extending through the stem in the direction of the length of the shaft C. The upper end or head, $g$, of the support $g'$ is provided in its bottom with recesses $g^4$, and with an internal circumferential flange or rib, $g^5$, as also seen in Fig. 13. The tubular bearing G is provided with a circumferential groove, $g^2$, midway between its ends, and at each side of said groove the sides of the bearing are flattened, as at $g^3$. This is for the purpose of allowing the bearing to be inserted vertically into the concave socket $g$, the latter being of such width as to receive and firmly hold the bearing from turning. In case the bearing should be a little loose, the upper edges of the socket are bent or hammered inward slightly over the top of the bearing. The rib or flange $g^5$ fits into the annular groove $g^2$ and prevents end-play of the bearing G. The support $g'$, or, more properly, its tubular stem $g^{10}$, fits in and works vertically through a socket, $g^7$, formed in the plate L, as shown in Figs. 1 and 16, the socket $g^7$ being provided with a vertical elongated slot, $g^8$, in alignment with the slot $g^6$ in the tubular stem $g^{10}$.

As shown in Figs. 1 and 16, upon the upper face of the cross-plate, just in rear of the socket therein, is an upwardly-extending lug, $c$, which forms a stop for the rear of the actuating-shaft and prevents it from escaping to the rear, its longitudinal escape from the front box being prevented by the closed front end of such box.

To the hopper or cross-plate L, or some other suitable part of the machine, in the present case by the same bolt and to the same lug as that to which the seed-spout is attached thereto, is swiveled at or about its center a lever, J. As shown in Fig. 16, the forward end, $j$, of the lever is placed through the slot $g^8$ in the socket and into the mortise $g^6$ of the sliding piece or support, and its rear end is provided with a handle for raising and lowering it, and through it the sliding piece, with its box, the rear end of the shaft, and the rear pinion. While any ordinary form of handle will perform the work effectively, the device we use is the most advantageous. By this construction the rear of the lever is broadened near and pointed at its end, the increase being by an easy curve below and abrupt above. This rear end extends between two laterally-projecting lugs, $k$, on the swiveled end of a handle, K, in a line with its length, by which in the movement of the handle the lever is actuated up or down, as shown in Figs. 1 and 16.

As shown in Fig. 15, the lower end of the handle or lever K is provided with a central perforation, and is recessed or countersunk on its outer face around this central hole or perforation, to form a socket, $k^2$. Within the central perforation is placed a tubular washer or block, $k^3$, provided with a circumferential flange, $k^4$, which fits freely into the socket $k^2$, as clearly shown in Figs. 15 and 16. The block or washer $k^3$ is provided with a squared or angular central perforation fitted to receive the angular neck of a bolt, $k^6$, by which it is secured to the frame-work. By screwing up the nut on the end of bolt $k^6$ the washer $k^3$ is bound firmly to the frame and prevented from turning, the washer forming the pivot for the lever K. The upper free end of lever K is fashioned into a weight, $k^5$, or has a weight attached thereto.

Figure 9:
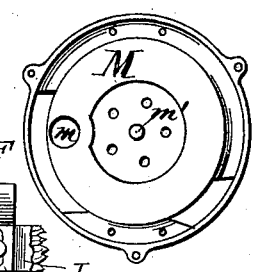
Figure 10:
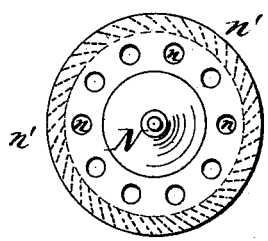
Figure 12:
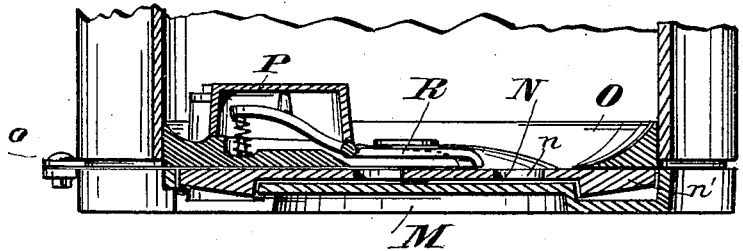

Seated upon lugs $l$, projecting from the cross plate or frame L, is secured the hopper base-plate M, having a hole, $m$, in its rear above the mouth of the seed-chute depending from the frame, and a central pivot, $m'$, upon which the seed-wheel rotates, as shown in Figs. 9 and 14. The seed-wheel N is a thin disk, of metal, with perforations $n$ a short distance from its periphery and gear-teeth $n'$ on its lower face, as shown in Figs. 10 and 14, with which the rear pinion engages when in mesh therewith. To the bottom edge of the hopper, in the inside thereof, is secured a rim or flange, O, preferably beveled from top to bottom, and having lateral projections $o$, by which the hopper is secured to the base-plate. Formed integral with this flange, or secured thereto, is an irregular piece of metal, P, which, with its connecting devices, forms an important auxiliary in the operation of seeding. The bottom of this piece is on a line with the bottom of the beveled flange or rim, sits down close to the seed-wheel, and has a pivotally-attached arm or cut-off, R, in front, with its free end normally held down to the face of the seed-wheel by a spring. Just beyond the rear of the cut-off is a depression, $p$, which forms a seat for a spherical plunger, Q, as shown in Fig. 14, and behind the depression is a slight central channel, $p'$, to provide an egress for any kernels of grain which by any means should fail to be dropped through the exit-hole in the hopper-plate.

By the employment of the rim or flange beveled toward the center of the hopper the tendency of the grain is to flow toward the center thereof and seek the perforations in the seed-wheel, and the danger of the seed packing or clogging in the lower inner periphery of the hopper is thereby avoided. The construction of the spring-arm or cut-off is such that but a single grain is permitted to pass thereunder at a time, and the position of the plunger when the parts are adjusted to the hopper-plate being such that it will always be over the exit-hole therein its tendency is to allow no grain to pass beyond such exit-hole, but to eject it therefrom; but if any grain should pass beyond such exit-hole without being so ejected the rear channel will serve as an outlet for it into the hopper, where it will in due course be again fed under the spring-arm, the rear channel thereby preventing any grain from remaining in the seeding devices and clogging the machine.

We do not limit ourselves to the precise construction of devices shown. Many modifications of the various elements going to make up the machine will readily suggest themselves to persons skilled in the art to which the present invention belongs.

We claim—

1. The herein-described devices for securing the carrying-wheel spindle to the frame, consisting of two parts concaved at one end to receive the end of the spindle, with projections from the centers of such concaves adapted to fit into corresponding holes on opposite sides of such spindle end or to partially fill on top and bottom a hole through such spindle end, a bolt-hole in the body of each part, a channel beyond such bolt-hole in each, a depression or recess in the extreme end of one and a projecting finger in the other to fit in such depression.

2. The herein-described devices for securing the carrying-wheel spindle to the frame, consisting of two parts concaved at one end to receive the end of the spindle, with projections from the centers of such concaves adapted to fit into corresponding holes on opposite sides of such spindle end, a bolt-hole in the body of each, a channel or groove beyond such bolt-hole in the lower part with a depression or recess in its extreme end, and a downwardly-projecting lug from its lower face, and a downwardly-projecting finger on the upper part adapted to fit into the depression on the lower part, substantially as described.

3. The herein-described lower spindle-fastening device having a downwardly-projecting lug from its lower face, a rear extension with transverse groove therein, a bolt-hole in such groove and through its body portion, substantially as described.

4. In a planter, the combination, with a frame, of an axle, $b^3$, provided with a hole or perforation in each end, a wheel, B, loosely mounted thereon, plates H I, provided with lugs $h^2\ i^2$, to enter the holes in the ends of the axle, and a bolt passing through said plates and securing them to the frame, substantially as shown.

5. In a planter or like machine having one or more carrying-wheels revolving upon a fixed spindle, the combination of the spindle $b^3$, having a hole through its ends, fastening devices H I, having bolt-holes $h\ i$, concaves $h'\ i'$, and projections $h^2\ i^2$ from the centers of such concaves, the lower device having a channeled front portion, $i^4$, a depression, $i^5$, in its extreme forward end, a downwardly-projecting lug, $i^3$, from its lower face, the upper having a downwardly-curved projecting finger, $h^3$, in front adapted to fit into the depression $i^5$ in the lower device, and the bolt passing through both devices and the frame of the machine, all constructed and arranged substantially as described.

6. In a planter or like machine having one or more carrying-wheels revolving upon a fixed spindle, the combination of the spindle $b^3$, having a hole through its ends, fastening devices H I, having bolt-holes $h\ i$, concaves $h'\ i'$, and projections $h^2\ i^2$ from the centers of such concaves, the lower device having a channeled front portion, $i^4$, a depression, $i^5$, in its extreme forward end, a downwardly-projecting lug, $i^3$, from its lower face, the upper having a downwardly-curved projecting finger, $h^3$, in front adapted to fit into the depression $i^5$ in the lower device, the draft-bail $i^9$, and the bolt passing through both devices and the frame of the machine, all constructed and arranged substantially as described.

7. In a planter substantially such as shown, the combination of a frame, a driving-wheel provided with concentric rows of cogs, a seeding mechanism, a shaft for transmitting motion from the driving-wheel to the seeding devices, a laterally-adjustable box for said shaft at its forward end, and a vertically-adjustable box at its rear end.

8. In a planter substantially such as shown, the combination, with a frame, a driving-wheel, and seeding devices, of a shaft for transmitting motion from the wheel to the seeding devices, a vertically-adjustable box or bearing at the rear end of the shaft, a lever journaled on the frame and connected to the adjustable box or bearing and serving to raise and lower the same.

9. In a planter substantially such as shown, the combination of frame A, wheel B, seeding devices mounted on the frame, a shaft, C, for transmitting motion from the wheel to the seeding devices, a plate, L, a socket, $g^7$, formed therein, a vertical slot, $g^8$, in said socket, a support, $g'$, provided with stem $g^{10}$, concave seat $g$, and slot $g^6$, a bearing, G, placed in the concave seat $g$ and supporting the shaft C, and pivoted levers J K, arranged, substantially as shown, to raise and lower the support $g'$.

10. In a corn-planter or like machine, the combination, with the frame mounted upon a carrying-wheel in front, having a series of gear-teeth formed on its side in a line with or parallel to its periphery, a seed-box and a rotating seed-wheel, a shaft, supporting-pinions which mesh with the carrying-wheel teeth in front and teeth on the lower face of the seed-wheel in the rear, journaled at right angles to the axis of the carrying-wheel in a bearing fixed vertically but adjustable laterally in front, and in a vertically-sliding bearing in the rear, and in a bearing embraced in the grooved top of a support sliding up and down in a socket-piece secured to the hopper or cross-plate in the rear, with said pinions, bearings, support, and socket-piece, substantially as described.

11. In a corn-planter or other like machine having a carrying-wheel in front, an actuating-shaft at right angles to the axis thereof, working in a bearing in front, having a closed forward end, and in a bearing in the rear with a stop-lug, as c, upon the cross-frame of the machine in the rear of the rear end of the shaft, substantially as described.

12. A tubular box or bearing flattened slightly on opposite sides of its periphery with a central peripheral groove, and a support therefor having a grooved or dished upper end, the space between the ends of the groove being smaller than the diameter of the box or bearing, and a central ridge or flange in the length of such groove corresponding with the groove in the box or bearing and permitting the latter to fit therein when adjusted, substantially as described.

13. The herein-described lever for actuating the rear bearing-support, pivoted at or about its center to the frame of the machine, its forward end engaging with such support, its rear portion broadened near and pivoted at its end, the increase being by an easy curve below and abrupt above, and adapted to be received between and actuated by two laterally-projecting lugs on the swiveled end of a handle on a line with its length, substantially as described.

14. The herein-described lever for actuating the rear bearing-support, pivoted at or about its center to the frame of the machine, its forward end engaging with such support, its rear portion broadened near and pivoted at its end, the increase being by an easy curve below and abrupt above, and adapted to be received between and actuated by two laterally-projecting lugs on the swiveled end of a handle on a line with its length, with such handle swiveled at its lower end to the frame of the machine and its upper or free end weighted, substantially as described.

15. A handle for actuating the rear sliding box-lever, constructed with a large hole in its lower end countersunk on its outer face, and swiveled to the frame by a washer having a square bolt-hole in its center and a peripheral flange to fit such countersunk hole in the end of the handle, and a square bolt passing through the central hole in the washer.

16. In a planter the combination of a hopper-plate and seed-wheel, as above described, with the devices at the base of the hopper consisting of a rim or flange in the inner periphery thereof beveled from top to bottom, with an irregular piece of metal secured thereto or made integral therewith, and the spherical plunger and spherical plunger-seat, all constructed and arranged substantially as described.

17. In a planter, substantially such as shown, the combination, with plate M, having orifice m, rotary disk N, provided with holes n, housing P above disk N, provided with pivoted cut-off R, and a socket, p, immediately over the opening m, and spherical plunger Q, seated loosely in the socket p, as and for the purpose set forth.

18. In a planter, the combination of the carrying-wheel, its spindle, the spindle-fastening devices, the actuating-shaft with its pinions, the front and rear boxes therefor, the sliding support for the rear box, the socket in the hopper-frame therefor, the lever for actuating the rear end of the shaft, the swiveled handle engaging with the handle with a weighted free end, and the seed-wheel, all constructed and arranged substantially as described.

19. In a planter, the combination of the carrying-wheel, its spindle, the spindle-fastening devices, the actuating-shaft with its pinions, the front and rear boxes therefor, the sliding support for the rear box, the socket in the hopper-frame therefor, the lever for actuating the rear end of the shaft, the swiveled handle engaging with the handle with a weighted free end, the seed-wheel, and the hopper-plate and the parts at the base of the hopper, all constructed and arranged substantially as described.

CHAS. E. WHITE.
JAMES MORPHY.

Witnesses:
J. B. OAKLEAF,
L. S. O'NEILL.